United States Patent Office 3,448,319
Patented June 3, 1969

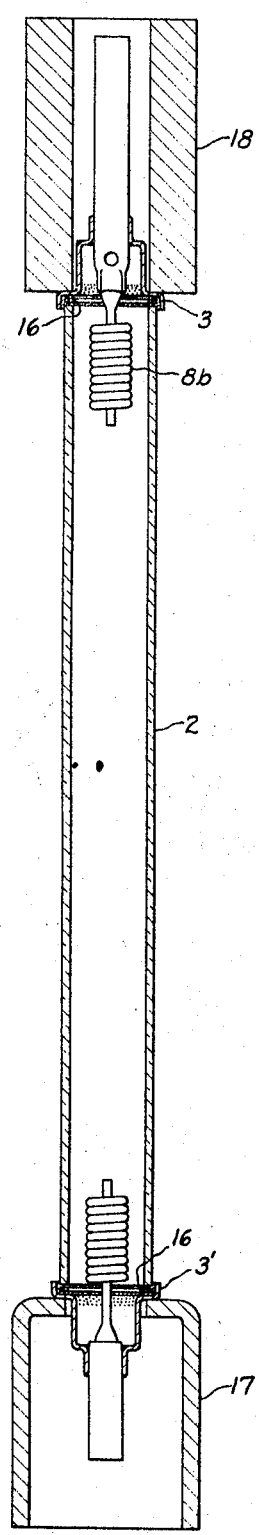
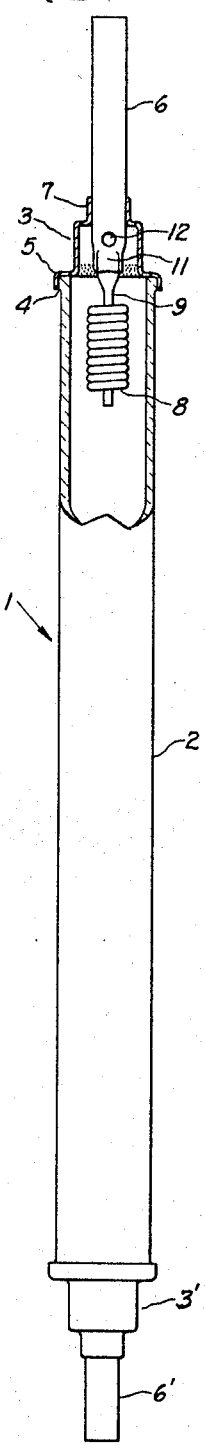
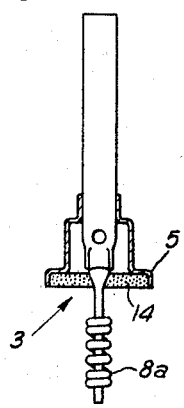
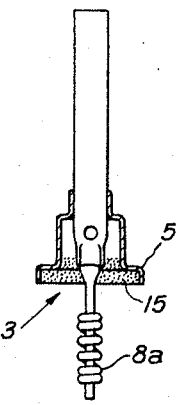

3,448,319
NIOBIUM END SEAL
William C. Louden, South Euclid, Ohio, assignor to General Electric Company, a corporation of New York
Filed Oct. 31, 1966, Ser. No. 590,568
Int. Cl. H01j 61/30, 61/18
U.S. Cl. 313—221                                5 Claims

ABSTRACT OF THE DISCLOSURE

A niobium end cap for an alumina ceramic lamp has the mating surface coated with a sintered layer of tungsten and tungsten oxides. Such layer is completely overcoated with a layer of vitreous sealing material so that none of it is exposed to the sodium vapor in the arc tube.

---

This invention relates to sealing refractory metal parts to alumina ceramic, and more particuraly to sealing niobium end caps to tubular lamp envelopes of alumina ceramic.

Envelopes of high density transparent polycrystalline alumina are used for alkali metal vapor discharge lamps because they withstand the attack of the vapors even at high temperatures. Patent 3,243,635, Ceramic Lamp Construction, issued Mar. 29, 1966, to myself and Richard S. Pinter, describes a ceramic lamp construction particularly suitable for high pressure sodium or cesium vapor lamps which utilizes a niobium end cap making a close fit on the end of an alumina ceramic tube and sealed to it by a thin layer of sealing material. The sealing material is a eutectic or near-eutectic mixture comprising mainly aluminum oxide and calcium oxide and optionally magnesium oxide, and it is resistant to alkali metal vapor attack. The sealing material is present as a thin layer having a thickness in the range of capillary attraction located between the mating surfaces of the ceramic envelope and the niobium end cap and bonded to both surfaces.

The object of this invention is to improve the bonding of the sealing material to the niobium surface in order to achieve a seal which is stronger and more resistant to alkali metal vapor attack and thermal cycling.

In accordance with my invention, the mating surface of the niobium or niobium-rich alloy end cap is provided with a sintered tungsten layer consisting principally of tungsten metal and including some oxygen or lower oxides of tungsten forming an interfacial zone. This tungsten layer or zone is completely overcoated with a layer of ceramic sealing material so that none of it is exposed to the alkali metal vapor such as the sodium vapor in the arc tube. More of the sealing material provides the bond between the end cap and the alumina tube proper.

A preferred method of making the seal in accordance with my invention consists in first mixing tungsten trioxide with a minor percentage by weight of ceramic sealing composition, coating such mixture on the sealing surface of the niobium cap, and sintering in vacuum above the melting temperature of the sealing composition. The tungsten coated surface of the niobium end cap is then completely coated over with a layer of sealing material and again fired in vaccum above the melting temperature of the sealing composition. Finally an alumina ceramic tube is assembled with a pair of end caps previously treated as described, and with more sealing material disposed between the ends of the alumina tube and the end caps. The whole assembly is fired in high vacuum to a temperature sufficient to melt the sealing material, for instance about 1500° C. The sealing material spreads out between the mating surfaces of the alumina tube and the niobium end caps, filling the joint, and upon cooling the parts are bonded together.

In the drawing, FIGS. 1 to 3 illustrate successive stages in sealing the end caps or closures of a tubular alumina ceramic discharge lamp, and FIG. 4 shows the completed lamp.

Referring to the drawing and particularly FIG. 4, the illustrated lamp or arc tube 1 comprises an envelope 2 of ceramic tubing consisting of sintered high density polycrystalline alumina. Such material and a method of preparing same is discolsed in U.S. Patent No. 3,026,210, Coble, Transparent Alumina and Method of Preparation. The ends of the tube are closed by thimble-like end caps 3, 3' of niobium or niobium-rich alloy hermetically sealed to the ceramic by means of a sealing composition comprising primarily aluminum oxide and calcium oxide. At the upper end of the tube which is shown sectioned, the sealing material exaggerated in thickness in order to permit illustration, is indicated at 4 in the space between the expanded shoulder portion 5 of the end cap and the side and end of the ceramic tube. A niobium tube 6 penetrates into the thimble and is brazed or welded to the reduced diameter collar portion 7. A thermionic electrode 8 is mounted in each end of the arc tube and consists of a double layer tungsten wire coil with the interstices filled with activating material in the form of alkaline earth oxides. The tungsten coil is wound over a tungsten shank 9 which is brazed in the crimped inner end 11 of niobium tube 6. Tube 6 of upper end cap 3 is apertured at 12 into the interior of the arc tube and is used as an exhaust tube during the subsequent manufacture to introduce the gas filling and the sodium mercury amalgam dose into the arc tube. Metal tube 6' of lower end cap 3' is not apertured, being merely a dummy to support the electrode.

The features and structural details of the improved seal in accordance with the invention will be most readily understood from a description of the procedure followed in making it. A preferred sealing method according to the invention for producing the sealed envelope of FIG. 4 will therefore be described by reference to FIGS. 1 to 3. A suspension of tungsten trioxide in a suitable binder with a minor proportion of sealing composition consisting primarily of aluminum oxide and calcium oxide is painted on the interior surface of the expanded shoulder portion 5 of the end cap, as shown at 14 in FIG. 1, and dried. A preferred mixture consists of tungsten trioxide with 10% by weight of a eutectic composition of 52.2% $Al_2O_3$ and 47.8% CaO. A batch suitable for preparation in a small ball mill may consist of 4.5 grams $WO_3$, 0.50 gram of 50 weight percent CaO and 50 weight percent $Al_2O_3$, and 2.5 grams of acrylic binder (Acryloid A–10, Rohm & Haas Co.) with ethylene glycol monoethyl ether (Cellosolve) or other suitable solvent to give the proper consistency for painting. The painted end caps are dried, and then placed in a vacuum furnace and taken up to 1500° C. in vacuum in order to sinter the coating. Upon cooling, the surface of coated area of the end cap is darkened. This coat greatly improves the bonding strength of the sealing material to the niobium end cap: fracture tests indicate a severalfold increase in the force required to rupture the bond between the sealing material and the niobium surface. The minor proportion of sealing composition serves as a base layer, adhering to the tungsten and oxide interface, for subsequent coatings.

Microscopic examination and other tests of the coating indicate that it comprises primarily tungsten metal. However it must also include either oxygen or some of the lower oxides of tungsten, and also possibly calcium aluminum tungstate, because a reaction with sodium takes place unless precautions are taken to completely overcoat the tungsten layer and isolate it from the alkali metal atmosphere of the lamp. Unless this is done, accelerated clean-up of the sodium filling takes place and simultaneously the seals are attacked and eventually destroyed. Indications are that the sodium combines with oxygen present in the tungsten layer and the sodium oxide thereupon attacks the seals.

A suitable material for the protective coating is a pre-fired eutectic or near-eutectic composition comprising mainly aluminum oxide and calcium oxide and including a minor proportion of magnesium oxide and having a flow or melting point above 1400° C.; a preferred composition consists of 54.0 weight percent alumina, 38.5 weight percent calcia, and 7.5 weight percent magnesia. An alternative mixture also suitable is the previously described eutectic mixture of alumina and calcia, namely 52.5% $Al_2O_3$ and 47.8% CaO. A coating composition may be prepared by mixing the foregoing ingredients in appropriate proportions, firing to a liquid, cooling, grinding to a powder and making a suspension in a suitable liquid such as the previously mentioned acrylic binder or a 1% polyox (polyethylene oxide) solution in water. A thin layer is brushed into the shoulder portion of the thimble or end caps over the tungsten trioxide layer, as indicated at 15 in FIG. 2 and dried. The end caps are then placed in the vacuum furnace and sintered at 1500 to 1600° C. in a vacuum. Upon cooling and removal from the furnace, the sealing surface of the end cap appears darkened due to the sealing composition particles adhering to it over the tungsten-tungsten oxide coating.

The electrode of the end cap is next prepared for activation by painting a suspension of emission material on the inner coil 8a (FIG. 2). The emission material may consist of a mixture of alkaline earth oxide including barium oxide suspended in a suitable binder. Thereafter the outer coil 8b is screwed on over the inner coil (as shown in FIG. 3), the assembly is dried in an oven at about 100° C. for a few minutes and any excess emission material is brushed off.

For the sealing operation proper, a ceramic tube 2 is assembled with a pair of presintered end caps and sealing glass washers 16. A suitable composition for the glass of the washers is 7.5 weight percent magnesia, 38.5 weight percent calcia, and 54.0 weight percent alumina, as described and claimed in copending application Ser. No. 388,567, filed Aug. 10, 1964 by Paul J. Jorgensen, entitled "Ceramic Bonding" and assigned to the same assignee as the present invention. The sealing washers may be prepared by blending appropriate quantities of the oxides, melting in a platinum or similar inert crucible at a temperature in excess of 1500° C., and quenching to a glass by pouring the crucible contents into water. The glass fragments are then pulverized, mixed with a binder, pelletized and pressed into rings or washers of a size matching the end of the ceramic tube.

The parts are assembled in the proper arrangement and stacked vertically in a suitable jig or fixture preferably made of molybdenum in order to withstand the heat of the furnace. End cap 3′ provided with a dummy exhaust tube is located lowermost and supported on a pedestal 17; a sealing washer 16 is placed within the expanded shoulder of the end cap and alumina tube 2 is seated on it. Another sealing washer 16 and an end cap 3 having an exhaust tube are seated on the upper end of the alumina tube. A tungsten weight 18 is placed on upper end cap 3 in order to press all the parts together. For convenience, a number of such assemblies may be placed on a suitable rack for simultaneous processing in the furnace.

The firing procedure proper comprises pumping the furnace down to a high vacuum, suitably $5 \times 10^{-6}$ torr and raising its temperature to about 1300° C. The emission mixture on the cathodes is outgassed at this stage and the liberated gases are removed, along with any gases and contaminants occuled in the alumina tube and metal parts. The furnace temperature is then raised to about 1500° C.; at this temperature the sealing washers melt and spread out between the mating surfaces of the alumina tube 2 and the niobium end caps 3, 3′ and fill the joints. Upon cooling, the parts are bonded together with only a small fillet of the sealing composition indicated at 4 showing at the joining or meeting edges.

The further processing of the arc tube required in order to make same into a high pressure sodium vapor lamp such as that of Patent 3,248,590, Schmidt, High Pressure Sodium Vapor Lamp involves inserting a sodium-mercury amalgam charge into the envelope activating the electrodes by arcing in argon, providing a filling of xenon at the desired pressure, and pinching off the end of exhaust tube 6 by a cold weld or other suitable means.

While the invention has been described by reference to a specific process as carried out on a preferred lamp construction, the details which have been illustrated and described are intended as exemplary and not in order to limit the invention thereto except insofar as included in the accompanying claims.

What I claim as new and desire to secure by Letters Patent of the United States is:

1. A lamp envelope comprising an alumina ceramic tube having thin-walled niobium or niobium-rich alloy closures each including a portion engaging an end of said tube, an interfacial zone and oxides of tungsten at the sealing surface of said portion, and sealing material comprising primarily alumina and calcia between said tube and said zone and bonding said closure hermetically to said tube.

2. A lamp envelope as defined in claim 1 wherein the interfacial zone of tungsten and oxides of tungsten is completely overcoated by a thin layer of sealing material consisting primarily of alumina and calcia.

3. A lamp envelope as defined in claim 1 wherein the ceramic is high density polycrystalline alumina, the closure is a thimble-like end cap having an expanded shoulder portion fitting around the end of the tube, and the inside sealing surface of said shoulder portion has the coating of tungsten and oxides of tungsten.

4. A lamp envelope as defined in claim 1 wherein the sealing material consists of a low melting mixture of alumina, calcia and magnesia.

5. The method of sealing an alumina ceramic lamp envelope with niobium or niobium-rich alloy end caps comprising applying a coating of tungsten trioxide mixed with a minor proportion of a sealing composition comprising primarily alumina and calcia to the sealing surface of said end cap, firing said end cap at a temperature sufficient to melt said sealing composition, assembling an alumina tube with a precoated end cap at each end and a sealing washer of a sealing glass composition interposed between the end of the tube and the end cap, axially pressing said parts together, and firing same at a temperature high enough to melt the sealing washers.

References Cited

UNITED STATES PATENTS

| | | | |
|---|---|---|---|
| 2,776,472 | 1/1957 | Mesick | 29—473.1 |
| 2,996,401 | 8/1961 | Welch et al. | 29—473.1 |
| 3,110,571 | 11/1963 | Alexander | 29—473.1 |
| 3,243,635 | 3/1966 | Louden et al. | 313—317 |
| 3,324,543 | 6/1967 | McVey et al. | 29—472.9 |

JOHN W. HUCKERT, *Primary Examiner.*

R. F. POLISSACK, *Assistant Examiner.*

U.S. Cl. X.R.

29—472.5, 473.1, 473.3; 174—50.5, 50.61, 50.63; 313—277, 249, 311, 317, 318